United States Patent
Isaji et al.

(10) Patent No.: US 8,026,799 B2
(45) Date of Patent: Sep. 27, 2011

(54) VEHICLE COLLISION DETERMINATION APPARATUS

(75) Inventors: Kazuyoshi Isaji, Kariya (JP); Naohiko Tsuru, Handa (JP)

(73) Assignee: Denso Corporation, Kariya (JP)

( * ) Notice: Subject to any disclaimer, the term of this patent is extended or adjusted under 35 U.S.C. 154(b) by 1043 days.

(21) Appl. No.: 11/901,678

(22) Filed: Sep. 18, 2007

(65) Prior Publication Data

US 2008/0074246 A1 Mar. 27, 2008

(30) Foreign Application Priority Data

Sep. 21, 2006 (JP) ................................ 2006-256074

(51) Int. Cl.
*B60Q 1/00* (2006.01)

(52) U.S. Cl. ............ 340/435; 701/301; 701/45; 701/46; 180/271; 180/274

(58) Field of Classification Search .................. 701/301, 701/96, 45, 302, 46; 340/436, 435; 180/271, 180/274

See application file for complete search history.

(56) References Cited

U.S. PATENT DOCUMENTS

| | | | |
|---|---|---|---|
| 6,504,473 B2 | 1/2003 | Ichikawa et al. | |
| 6,560,520 B2 * | 5/2003 | Yokota et al. | 701/45 |
| 6,708,095 B2 * | 3/2004 | Prakah-Asante et al. | 701/45 |
| 6,757,611 B1 * | 6/2004 | Rao et al. | 701/301 |
| 6,940,448 B2 * | 9/2005 | Knoop et al. | 342/70 |
| 7,131,512 B2 * | 11/2006 | Aoki | 180/271 |
| 7,137,472 B2 * | 11/2006 | Aoki | 180/274 |
| 7,213,687 B2 * | 5/2007 | Sakai et al. | 188/4 R |
| 7,392,883 B2 * | 7/2008 | Hikita | 187/249 |
| 7,617,048 B2 * | 11/2009 | Simon et al. | 701/301 |
| 7,708,102 B2 * | 5/2010 | Takehara et al. | 180/274 |
| 2005/0267683 A1 | 12/2005 | Fujiwara et al. | |
| 2007/0021876 A1 | 1/2007 | Isaji et al. | |
| 2007/0106474 A1 * | 5/2007 | Ide | 701/301 |
| 2008/0074246 A1 * | 3/2008 | Isaji et al. | 340/435 |
| 2010/0312435 A1 * | 12/2010 | Mase et al. | 701/46 |

FOREIGN PATENT DOCUMENTS

DE 10 2004 056 120 5/2006
JP 2002-002426 1/2002

OTHER PUBLICATIONS

Office action dated Mar. 19, 2008 in German Application No. 10 2007 043 157.2 with English translation thereof.
Office action dated Jun. 27, 2008 in Japanese Application No. 2006-256074 with English translation thereof.
U.S. Appl. No. 11/805,236, filed May 22, 2007, Isaji et al.
U.S. Appl. No. 11/703,812, filed Feb. 7, 2007, Isaji et al.

* cited by examiner

*Primary Examiner* — Thomas Black
*Assistant Examiner* — Wae Louie
(74) *Attorney, Agent, or Firm* — Harness, Dickey & Pierce, PLC

(57) ABSTRACT

A collision determination apparatus detects a current value of a lateral acceleration of a subject vehicle for calculating a collision risk index, and the collision risk index is used to determine the risk of collision of the subject vehicle with a front object. As the collision risk index takes the lateral acceleration of the subject vehicle into account, the collision risk index correctly represents a risk of collision of the subject vehicle with the front object when the subject vehicle is traveling in a condition that is under an influence of the lateral acceleration.

9 Claims, 4 Drawing Sheets

$TTC\_gy = D/(|Vr\_p| - |Vr\_y\_p|)$ $Vr\_y\_p = -(R \times Gy\_p)^{1/2}$ $R = ((D+y)^2 - L^2)/2 \times L$ ※ $TTC = D/|Vr\_p|$

VEHICLE COLLISION DETERMINATION APPARATUS

CROSS REFERENCE TO RELATED APPLICATION

This application is based on and claims the benefit of priority of Japanese Patent Application No. 2006-256074 filed on Sep. 21, 2006, the disclosure of which is incorporated herein by reference.

FIELD OF THE DISCLOSURE

The present disclosure generally relates to a collision determination apparatus for use in a vehicle.

BACKGROUND INFORMATION

Conventionally, a parameter called Time To Collision (TTC) has been used as an index for a degree of risk of collision of a subject vehicle with an obstacle as described in Japanese patent document JP-A-2005-324700 (This document is also published in United States as 2005-0267683). The parameter TTC represents a period of time to a collision of the subject vehicle to the obstacle.

The TTC represents, in other words, the period of time to the collision if the subject vehicle maintains a traveling condition at the time of the calculation of the TTC. Further, by another definition, the TTC is a "100% probability" of the collision of the subject vehicle if the subject vehicle maintains a "current" traveling condition at the time of TTC calculation.

The TTC is effective for representing a degree of risk of collision of the subject vehicle with the obstacle that exists in front of the subject vehicle (a front object) when the vehicle is traveling in a straight path. However, when the traveling condition of the subject vehicle is under an effect of a sideway acceleration, the TTC does not serve as a correct index for representing the degree of risk of collision with the front object.

For example, when a driver of the subject vehicle operates a steering wheel to avoid the collision with the front object, the TTC does represent the correct index of the degree of risk of the collision with the front object during the period of time before the driver starts operating the steering wheel (i.e., while the subject vehicle is traveling in the straight path).

Once the steering wheel operation has started for avoiding the collision, the traveling condition of the subject vehicle transits from a straight travel condition to a sideway acceleration affected condition. In the sideway acceleration affected condition, the TTC is calculated based on the distance of the subject vehicle from the front object, and a relative speed relative to the front object. That is, the TTC is calculated based on the variables that are defined only by the motion of the subject vehicle in a front-rear direction, and not on the variables defined by the motion in the lateral direction.

Therefore, if the traveling condition of the subject vehicle generates the sideway acceleration of the subject vehicle, the TTC does not represent the correct index of the degree of risk of the collision of the subject vehicle with the front object, thereby yielding a false value of the degree of danger (i.e., 100% probability) of the collision of the subject vehicle with the front object even after the subject vehicle has started the collision avoidance motion.

SUMMARY OF THE DISCLOSURE

In view of the above and other problems, the present disclosure provides a collision determination apparatus that detects a correct degree of risk of collision of a subject vehicle with a front object even when the subject vehicle travels in a condition that generates a sideway acceleration.

The vehicle collision determination apparatus of the present disclosure includes a distance acquisition unit that acquires a distance between a subject vehicle and a front object that exits in front of the subject vehicle, a relative speed acquisition unit that acquires a relative speed of the subject vehicle relative to the front object, a lateral acceleration detector that detects a lateral acceleration for accelerating the subject vehicle in a lateral direction, a lateral acceleration dependent relative speed calculation unit that calculates the relative speed under an influence of the lateral acceleration, a collision risk index calculation unit that calculates a collision risk index for representing a risk of collision of the subject vehicle with the front object based on the distance acquired by the distance acquisition unit, the relative speed acquired by the relative speed acquisition unit, and the relative speed under the influence of the lateral acceleration calculated by the lateral acceleration dependent relative speed calculation unit, and a collision determination unit that determines the risk of collision of the subject vehicle with the front object by utilizing the collision risk index calculated by the collision risk index calculation unit. The relative speed of the subject vehicle changes depending on an increase and decrease of the lateral acceleration of the subject vehicle, thereby causing a change in the relative speed of the subject vehicle relative to the front object. Thus, the collision risk index that is calculated by taking the lateral acceleration dependent relative speed into account correctly reflects the risk of collision of the subject vehicle with the front object even when the subject vehicle is traveling in a condition that is under an influence of the lateral acceleration.

BRIEF DESCRIPTION OF THE DRAWINGS

Other objects, features and advantages of the present invention will become more apparent from the following detailed description made with reference to the accompanying drawings, in which.

DETAILED DESCRIPTION

Figure 1:
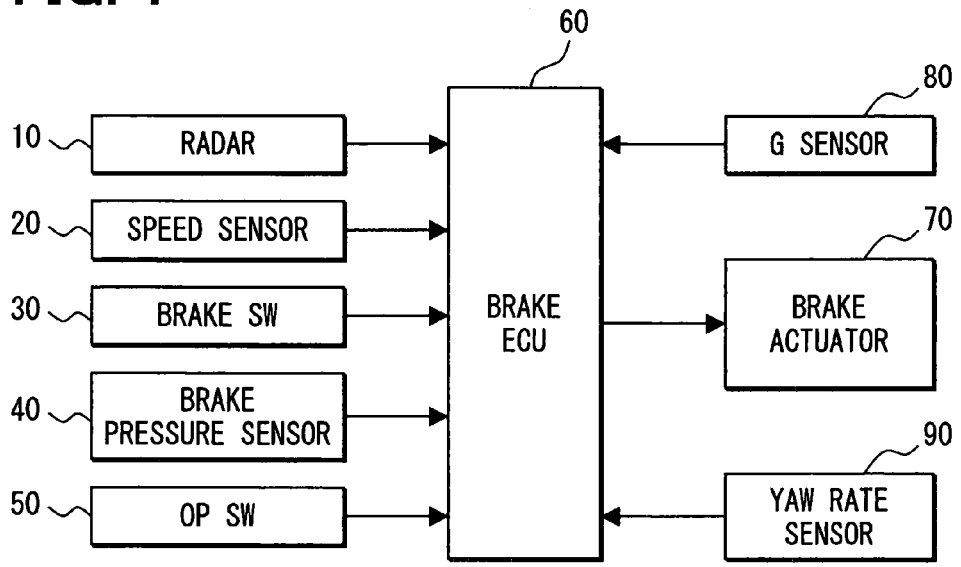
FIG. 1 shows a block diagram of a brake control apparatus for a vehicle in an embodiment of the present disclosure.

Embodiments of the present disclosure are described with reference to the drawings. In the present embodiment, a collision determination apparatus of the present disclosure serves as a function of a brake control apparatus for a vehicle. FIG. 1 shows a block diagram of a brake control apparatus for a vehicle. As shown in the figure, the brake control apparatus includes a radar 10, a speed sensor 20, a brake switch 30, a brake pressure sensor 40, an operation switch 50, a brake ECU 60, a brake actuator 70, an acceleration sensor 80, and a yaw rate sensor 90.

The radar 10 irradiates, for example, a laser light to a predetermined range in front of the subject vehicle, and receives a reflected light of the laser light for detecting a relative positional relations of a front object with the subject vehicle as well as a distance D from the subject vehicle to the front object such as a lead vehicle, a road incidental thing (a guardrail, a light reflector and the like). In this case, the relative speed Vr and the like can be calculated by time-differentiating the distance D that is detected by the radar 10. Further, in the present embodiment, the relative speed Vr is marked as negative (−:minus) when the subject vehicle nears the front object, and the relative speed Vr is marked as positive (+:plus) when the subject vehicle departs from the front object.

The speed sensor 20 detects a speed of the subject vehicle. When the relative speed Vr is calculated based on the distance D that is detected by the above-mantioned radar 10 and the speed of the subject vehicle is detected by the speed sensor 20, the speed of the lead vehicle is calculated based on the difference between the relative speed Vr and the speed of the subject vehicle.

The brake switch 30 detects a brake operation by a driver of the subject vehicle. The brake switch 30 outputs an ON signal when the driver steps on a brake pedal toward a floor of the vehicle, and outputs an OFF signal when the driver releases the brake pedal.

The brake pressure sensor 40 detects a brake fluid pressure in a brake unit (not shown in the figure) when the brake pedal is stepped on by the driver of the subject vehicle. The brake unit decreases a speed of the subject vehicle by, for example, applying a brake force in proportion to the brake fluid pressure through a disk pad that is brought to a frictional contact with a disk rotor fixed on each of the wheels of the subject vehicle. Therefore, speed decrease of the subject vehicle caused by a brake operation is estimated from the brake fluid pressure at a time when the driver of the subject vehicle operates the brake pedal.

The operation switch 50 is operated by the driver of the subject vehicle. An operation signal of he operation switch 50 is inputted to the brake ECU 60. In this case, the operation switch 50 provides to the brake ECU 60 an instruction for adjusting an amount of speed decrease of the subject vehicle, that is, for generating a soft speed decrease or a steep speed decrease when the brake ECU 60 performs an assist control of the brake operation by the driver of the subject vehicle.

The brake actuator 70 adjusts the brake fluid pressure in the brake unit to a desired value according to an instruction signal from the brake ECU 60 that is described in detail in the following. The G sensor 80 detects a longitudinal acceleration and a lateral acceleration of the subject vehicle. The longitudinal acceleration is an acceleration in a front-rear direction of the subject vehicle, and the lateral acceleration is an acceleration in a right-left direction, or a width direction of the subject vehicle.

The yaw rate sensor 90 detects a yaw rate of the subject vehicle. The yaw rate of the subject vehicle is defined as an angular velocity of the subject vehicle around a vertical axis of the subject vehicle.

The brake ECU 60 performs an assisting control of a braking force of the brake apparatus for avoiding a collision with a front object with a preferable speed reduction feeling based on input signals from various sensors and switches described above when the driver of the vehicle performs a brake operation on an occasion of an approach of the vehicle to the front object. In the present embodiment, an index of KdB that represents an approaching condition of the vehicle toward the front object such as a lead vehicle or the like is used to perform the assisting control. The details of the index KdB is described in the following.

The driver of the subject vehicle usually determines whether the subject vehicle is approaching the lead vehicle or departing from the lead vehicle based on a change of vehicle area in his/her vision, and adjusts the increase/decrease of vehicle speed by operating accelerator or brake when the subject vehicle has the lead vehicle in a traveling direction. Therefore, an index of the change of vehicle area in the vision to be utilized by the driver is calculated as the index KdB.

The calculation method of the index KdB is described in the following. Suppose an actual height of the lead vehicle is H0, an actual width is W0, and an area is S0 (=H0×W0), as well as a height in an image that reflects in an eye (i.e., retina) of the driver of the subject vehicle is H, a width is W, an area is S (=W×H), and further defining a distance from a lens of the driver's eye to the lead vehicle as D and a focal distance of the driver's eye as f, the area S of the lead vehicle is represented by an equation 4 in the following.

$$S = W \times H = W0 \times H0 \times (f/D)^2 \qquad \text{[Equation 4]}$$

Therefore, the change rate per unit time of the area S on the retina of the driver dS/dt is represented by an equation 5 in the following.

$$dS/dt = d(W \times H)/dt \propto d(f/D)^2/dt \propto d(1/D^2)/dt \qquad \text{[Equation 5]}$$

When the equation 5 is partially differentiated by the distance D, the change rate of the area S per unit time dS/dt is represented by an equation 6 in the following. The partial differeintiation of the equation 5 is defined as the change rate of the lead vehicle area per unit time K.

$$dS/dt \propto d(1/D^2)/dt = \{d(1/D^2)/dD\} \times (dD/dt) = (-2/D^3) \times Vr = K \qquad \text{[Equation 6]}$$

In this manner, the change rate of the lead vehicle area per unit time K is calculated by using the distance D between the lead vehicle and the subject vehicle, a relative speed Vr that is defined as a change rate of the distance D per unit time.

In this case, the change rate K is equivalent to a change rate of an image captured by an imaging unit such as a camera or the like because the change rate K represents the change rate dS/dt of the area S of the lead vehicle per unit time. Therefore, the change rate K may be calculated based on the change rate of the image captured by the camera or the like.

The change rate K changes in a very large scale in an order of 106 when, for example, the distance D is in a range between 1 and 100 meters. Therefore, the change rate K is represented in a unit of decibel.

The decibel representation is defined in a manner where a value of 0 decibel (dB) corresponds to a minimum area change rate of K0 of the lead vehicle recognizable by the driver at a time when the lead vehicle at 100 meters in front of the subject vehicle is approaching at the relative speed Vr of −0.1 km/h. The change rate K per unit time is represented by an equation 7 in the following.

$$K0 = (-2/D^3) \times Vr = (-2/100^3) \times (-0.1/3.6) \approx 5 \times 10^{-8} \qquad \text{[Equation 7]}$$

That is, when the change rate K0 of the area of the lead vehicle is equal to $5 \times 10^{-8}$, the decibel value is defined as 0 (dB) and the value of an equation 8 is defined as the index KdB that represents approaching condition of the subject vehicle toward the front object. In this case, the value of the index KdB is positive when the lead vehicle approaches the subject vehicle, and is negative when the lead vehicle departs from the subject vehicle. The absolute value of the figure is represented by using 11 signs.

$$KdB=10\times\log(|K/(5\times10^{-8})|)=10\times\log\{|-2\times Vr|/(D^3\times 5\times 10^{-8})\} \quad \text{[Equation 8]}$$

Figure 2:
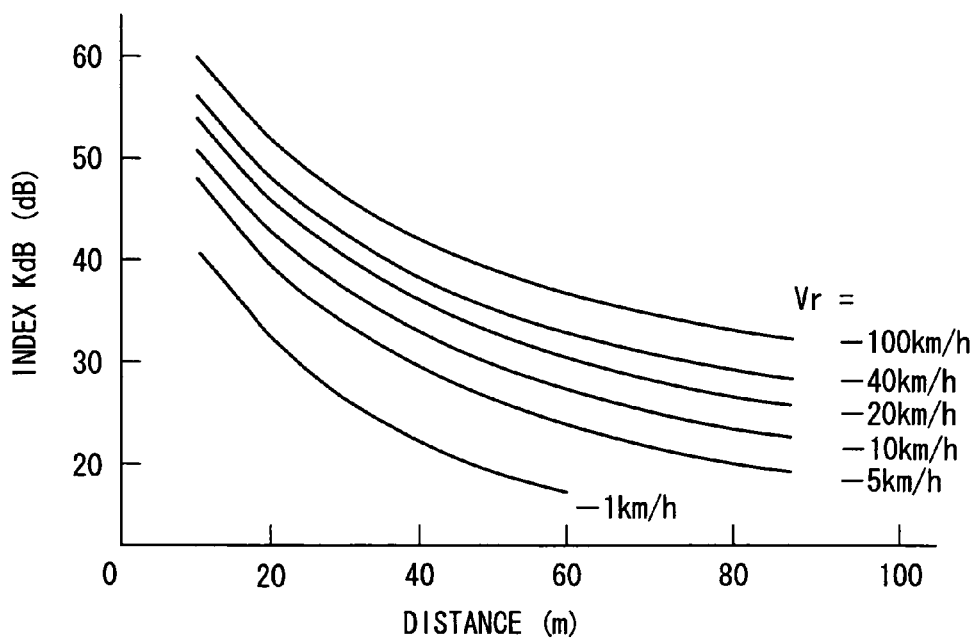
FIG. 2 shows characteristics curves of an index KdB that evaluates an approaching condition of the vehicle toward a front object.

The dependency of the index KdB defined by the equation 8 relative to the distance D toward the lead vehicle or the like and the relative speed Vr is depicted in the diagram in FIG. 2. As shown in FIG. 2, the index KdB increases when the relative speed Vr for approaching the front object increases, and, at each point of the relative speed, the inclination of increase becomes steep when the distance toward the front object D decreases.

Figure 3:
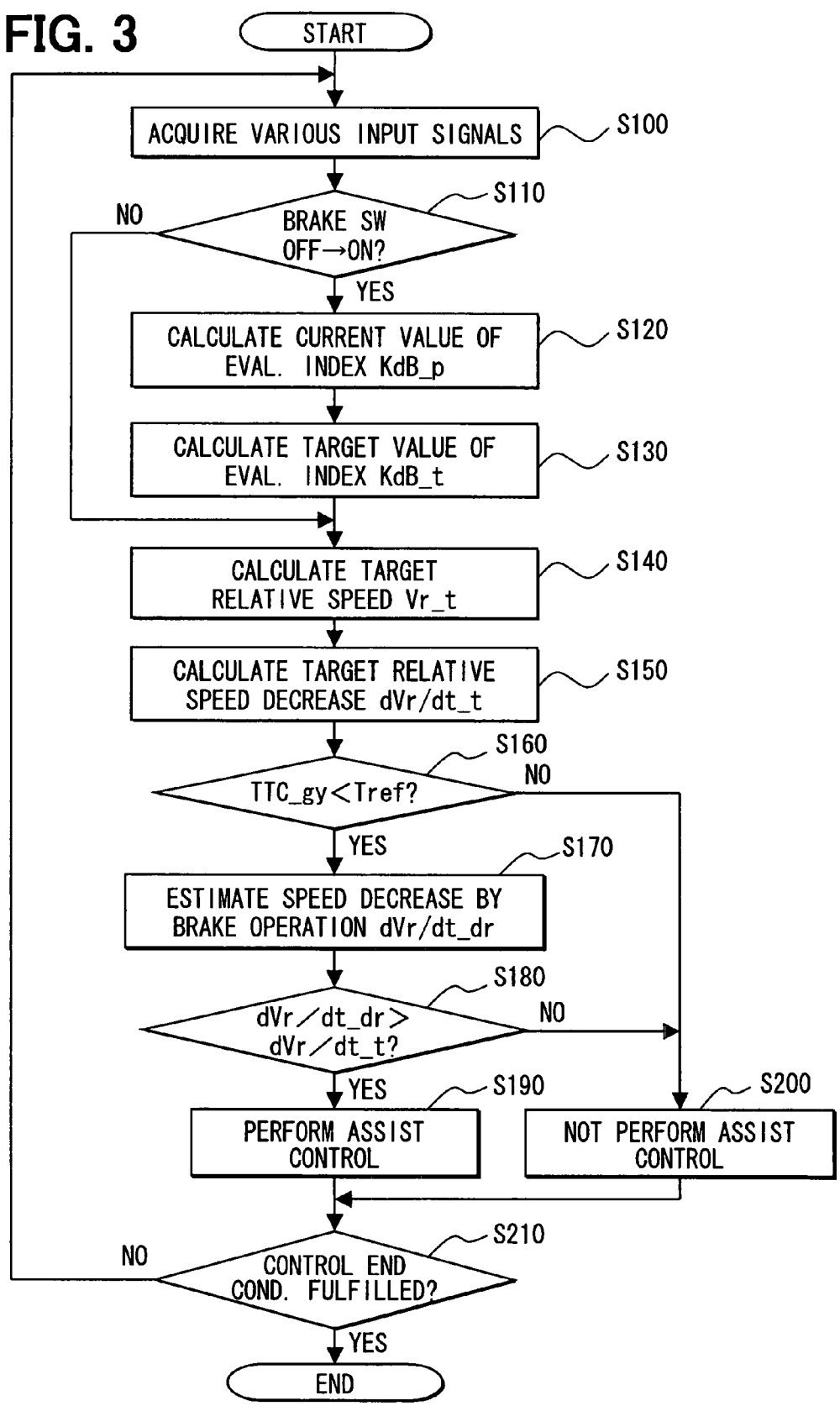
FIG. 3 shows a flowchart of an assisting control of a brake force.

Then, a process of the assisting control of the braking force performed by the brake ECU 60 is described in detail with reference to the flowchart in FIG. 3. In step S100, the ECU 60 acquires the input signals from various sensors and switches. In step S110, the process determines whether a detection signal of the brake switch 30 is changed from an OFF signal to an ON signal. That is, the process determines whether the driver of the subject vehicle has started a braking operation.

When the detection signal of the brake switch 30 is changed from OFF to ON in step S10 (S10:YES), the process proceeds to step S120 for calculating a current value KdB_p of the index KdB. More practically, the distance from the front object D detected by the radar and the change rate $V_r$ of the distance D per unit time are used in the equation 8 for calculating the current value KdB_p of the index KdB.

In step S130, the process calculates a target value KdB_t of the index KdB. The calculation method of the value KdB_t is described with reference to a diagram in FIG. 4. First, the current value KdB_p calculated in step S120 is used as an initial value KdB0, and an inclination 'a' of the index KdB at the time of start of speed decrease by a brake operation is calculated by differentiating the current value KdB_p by the distance D.

The target value KdB_t is calculated by using the value KdB0, the inclination a, the distance D0 at the time of start of speed decrease, a gain that depends on an operation signal of the operation switch 30, and the current distance toward the front object Dp as shown in an equation 9.

$$KdB\_t=\text{gain}\times a\times Dp+(a\times D0+KdB0) \quad \text{[Equation 9]}$$

Figure 4:
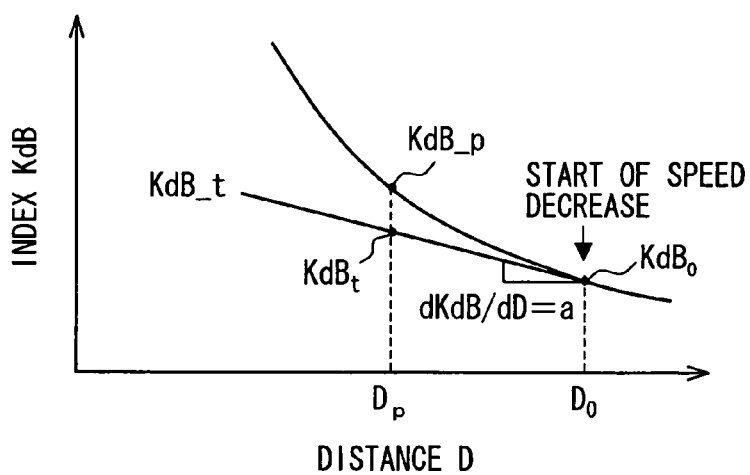
FIG. 4 shows an illustration of a calculation of a target value KdB_t of the index KdB.

That is, the target value KdB_t is calculated as a line of the index KdB with a constant increase inclination a when the distance toward the front object Dp decreases from the initial value KdB0 in FIG. 4. The target value KdB_t at the current distance Dp is calculated by substituting the value Dp in the calculation equation (equation 9).

In this case, the gain of the operation signal of the operation switch 30 takes, for example, one of the following three values of 0.9, 1, 1.0. When the gain is 1.0, the inclination a is not changed. When the gain is 0.9, the inclination a is changed to a smaller value, thereby increasing a speed decrease of the subject vehicle in comparison to the decrease of the relative speed Vr at the decrease of the distance D. On the other hand, when the gain is 1.1, the inclination a is changed to a larger value, thereby decreasing a speed decrease of the subject vehicle. In this manner, as the inclination a is multiplied by the gain that is indicated by the driver of the subject vehicle, the speed decrease of the subject vehicle by the assisting control is adjusted according to a preference of the driver of the subject vehicle when the braking force of the subject vehicle is assisted by the assisting control.

In step S140, a target relative speed Vr_t is calculated by using the target value KdB_t derived in step S130 with an equation 10.

$$Vr\_t=-\tfrac{1}{2}\times 10(KdB\_t/10)\times D^3\times 5\times 10^{-8} \quad \text{[Equation 10]}$$

That is, an index curve that passes the target value KdB_t at the current distance value Dp from the front object is assumed, and the relative speed is calculated from the index curve as the target relative speed Vr_t.

In step S150, the current distance value Dp is differentiated for calculating the target relative speed decrease dVr/dt_t by using the current relative speed from the front object Vr_p and the target relative speed Vr_t as shown in an equation 11.

$$dVr/dt\_t=(Vr\_P-Vr\_t)/\Delta t \quad \text{[Equation 11]}$$

In this case, $\Delta t$ is a divisor for converting the difference between the current relative speed Vr_p and the target relative speed Vr_t to the target relative speed decrease dV r/dt_t, and is arbitrarily defined.

In step S160, an index TTC_gy that is used for evaluation of a degree of risk of collision of the subject vehicle with the front object is calculated by an equation 12, and the value of the index TTC_gy is determined whether it is smaller than a predetermined value Tref.

$$TTC\_gy=D/(|Vr\_p|-|Vr\_y\_p|) \quad \text{[Equation 12]}$$

When the value of TTC_gy is smaller than the value of Tref in step S160 (S160:YES), the process proceeds to step S170 based on the determination that the degree of the risk of collision of the subject vehicle with the front object is high. When the value TTC_gy is equal to or greater than the value of Tref, the process proceeds to step S200 based on the determination that the degree of risk of the collision is low. In step S200, the process determines not to perform the assisting control of the braking force by the brake control unit of the present disclosure based on the determination that the collision with the front object is sufficiently in an avoidable condition by the brake operation of the driver or the like.

Figure 5:
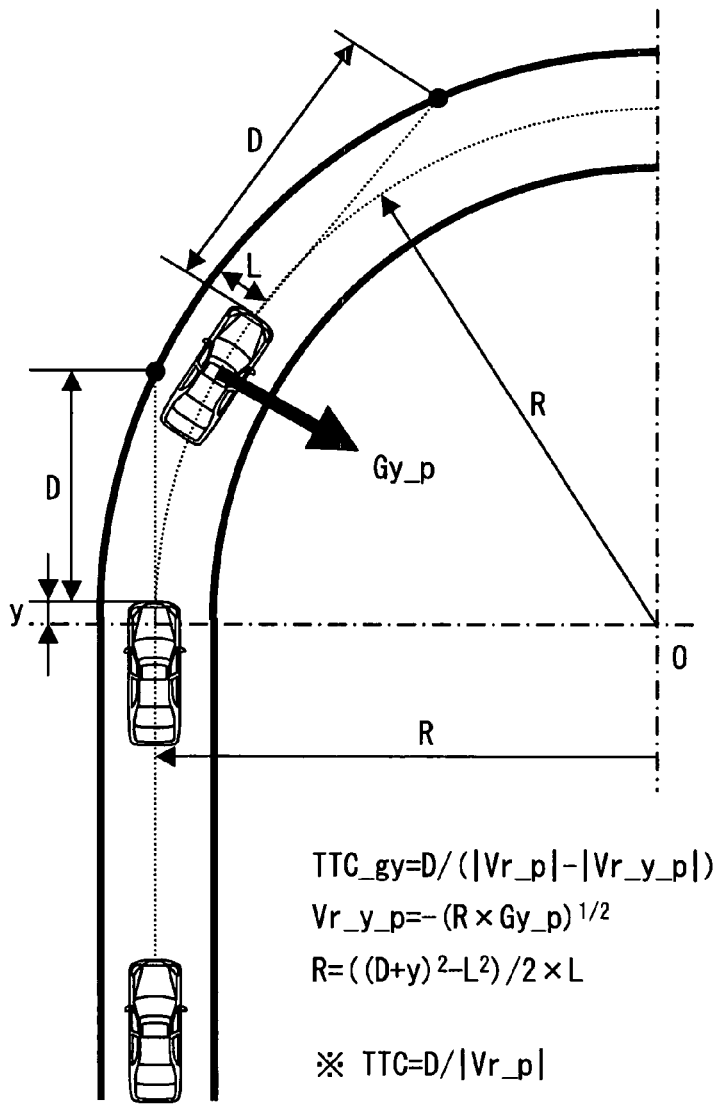
FIG. 5 shows an illustration of a calculation of a collision risk index TTC_gy that represents a degree of risk of collision of the vehicle in a curved road.

In this case, the detail of the index TTC_gy that represents the degree of risk of collision of the subject vehicle with the front object is described. As shown in FIG. 5, when the subject vehicle is traveling a curved road and a fixed object on the road is assumed to be the front object, a relationship of the distance D from the front object to the subject vehicle, a distance y from a front end of the subject vehicle to an axis of a front wheel, a distance L from a center point of a width of the subject vehicle at the axis of the front wheel to the fixed object on the road, and a turn radius R of the subject vehicle is represented by an equation 13.

$$(D+y)^2+R^2=(R+L)^2 \quad \text{[Equation 13]}$$

Based on the equation 13, the turn radius R of the subject vehicle is calculated by an equation 14.

$$R=\{(D+y)^2-L^2\}/2\times L \quad \text{[Equation 14]}$$

In this case, the turn radius R may be estimated from a detection result of the yaw rate sensor 90. Further, the turn radius R may be acquired as a curve radius of a curved road that is traveled by the subject vehicle from a road map data because the curve radius of the road and the turn radius R is considered identical.

When the subject vehicle is traveling the curved road, a current value Gy_p of a lateral acceleration in a lateral direction of the subject vehicle is used for calculating a current value of a lateral acceleration dependent relative speed Vr_y_p that is dependent of the increase/decrease of the lateral acceleration Gy_p by using an equation 15 in the following.

$$Vr\_y\_p=-(R\times Gy\_p)^{1/2} \quad \text{[Equation 15]}$$

Then, the distance D between the subject vehicle and the fixed object on the road, the relative speed $Vr\_p$ between the subject vehicle and the fixed object, and the current value of the lateral acceleration dependent relative speed $Vr\_y\_p$ are used to calculate the index $TTC\_gy$ that is defined in the equation 12.

In this manner, the index of the degree of risk of collision of the subject vehicle with the fixed object on the road (the front object) is calculated by including the current value of the lateral acceleration dependent relative speed $Vr\_y\_p$ that is defined by a motion of the subject vehicle in the lateral direction. Therefore, the value of the index $TTC\_gy$ for representing the degree of risk of collision varies according to the increase/decrease of the lateral acceleration $Gy\_p$, because the current value of the lateral acceleration dependent relative speed $Vr\_y\_p$ varies depending on the increase/decrease of the lateral acceleration $Gy\_p$.

The current value of the lateral acceleration dependent relative speed $Vr\_y\_p$ increase its absolute value as the lateral acceleration $Gy\_p$ increases as shown in the equation 15, and decreases its absolute value as the value $Gy\_p$ decreases. Therefore, as shown in the equation 12, the difference between the current value of the relative speed and the current value of the lateral acceleration dependent relative speed $|Vr\_p|-|Vr\_y\_p|$ decreases when the lateral acceleration $Gy\_p$ increases.

Therefore, because the value of the index $TTC\_gy$ increases as the lateral acceleration $Gy\_p$ increases, the degree of risk of collision of the subject vehicle with the fixed object on the road is determined to be low based on the index $TTC\_gy$ thus calculated even with the lateral acceleration $Gy\_p$ being generated therefrom.

Figure 6A:
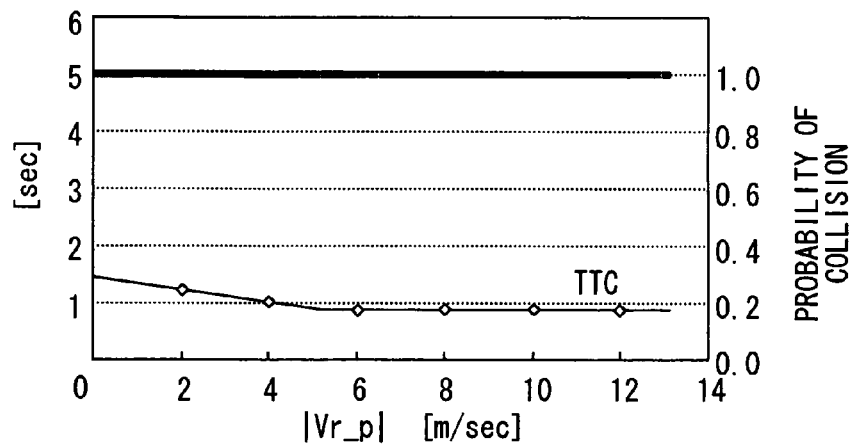
FIGS. 6A and 6B show diagrams of a conventional TTC index curve and the collision risk index TTC_gy curve.
Figure 6B:
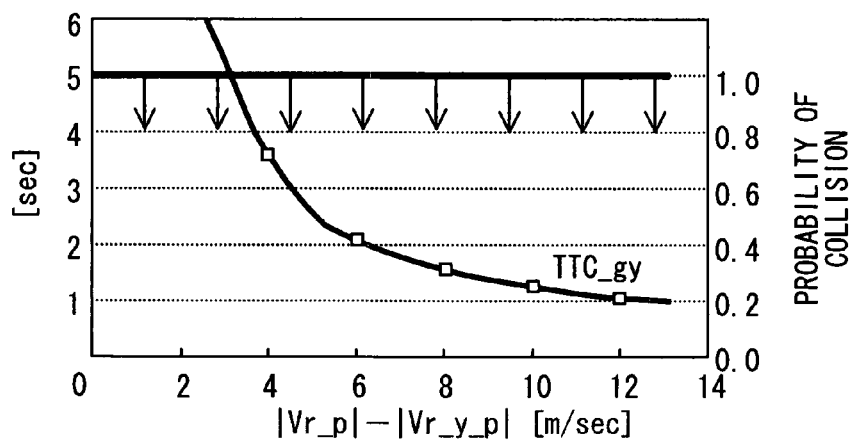

The diagrams in FIGS. 6A and 6B are used to compare the conventional index TTC ($=D/|Vr\_p|$) with the index $TTC\_gy$ when the subject vehicle travels on a curved road with the curve radius of 50 meters (the curve radius is assumed to be equal to the turn radius of the subject vehicle) at a speed V of 50 km/h (the speed V is equal to the relative speed $Vr\_p$ of the subject vehicle relative to the fixed object on the road due to the stable condition of the fixed object).

As shown in FIG. 6A, the conventional index TTC decreases when the current value of the relative speed $Vr\_p$ increases. That is, the probability of collision of the subject vehicle with the front object is always 100% as the degree of risk of collision even when the subject vehicle generates the lateral acceleration.

On the other hand, as shown in FIG. 6B, the index $TTC\_gy$ increases to infinity when the difference of the relative speed from the lateral acceleration dependent relative speed $|Vr\_P|-|Vr\_y\_p|$ decreases toward 0, that is, when the driver of the subject vehicle performs an appropriate steering operation along a curved road that leads to a generation of the lateral acceleration $Gy\_p$. That is, the probability of collision of the subject vehicle with the front object is equal to or less than 100% as the degree of risk of collision. Further, the index $TTC\_gy$ becomes equal to the conventional TTC when an equation $|Vr\_p|-|Vr\_y\_p|=|Vr\_p|$ is fulfilled, that is, when the driver of the subject vehicle maintains a straight travel condition without following a curved road shape for not generating the lateral acceleration, thereby representing the 100% probability of collision of the subject vehicle with the front object as the degree of risk of collision.

Therefore, according to the above reasoning, because the index $TTC\_gy$ represents a decrease of the degree of risk of collision of the subject vehicle with the front object when the lateral acceleration $Gy\_p$ is generated, the index $TTC\_gy$ correctly represents the degree of risk of collision of the subject vehicle with the front object when the subject vehicle has started a collision avoidance motion.

In step S170, the speed decrease of the subject vehicle $dVr/dt\_dr$ is estimated based on the brake pressure generated by the braking operation of the driver. Then, in step S180, the process determines whether the estimated speed decrease $dVr/dt\_dr$ corresponding to the braking operation of the driver is greater than the target relative speed decrease $dVr/dt\_t$. In this case, because the speed decrease is represented as a negative value, the estimated speed decrease $dVr/dt\_dr$ being greater than the target relative speed decrease $dVr/dt\_t$ indicates that the speed decrease by the braking operation of the driver is not sufficient for bringing the speed of the subject vehicle to the target relative speed decrease $dVr/dt\_t$.

Therefore, when the process in step S180 is determined as YES, the process proceeds to step S190 to perform the assisting control of the braking force. That is, the assisting control of the braking force is performed when the index $TTC\_gy$ takes a value that is smaller than the value Tref in a condition that the speed of the subject vehicle is not brought to the target relative speed decrease $dVr/dt\_t$ by the brake operation by the driver of the subject vehicle.

In step S190, the process performs, as the assisting control of the braking force, a control of the brake actuator 70 for generating a brake pressure that yields the target relative speed $dVr/dt\_t$ calculated in step S 50 based on a prepared map of the brake pressure, or a control of the brake actuator 70 for generating an appropriate brake pressure to bring an actual speed decrease to the target relative speed $dVr/dt\_t$ based on a detection of the actual speed decrease of the subject vehicle.

On the other hand, when the estimated speed decrease $dVr/dt\_dr$ by the driver of the subject vehicle in step S180 is determined to be smaller than the target relative speed decrease $dVr/dt\_t$, the speed of the subject vehicle is decreased by a greater speed decrease that is greater than the target speed decrease $dVr/dt\_t$. In this case, the speed decrease by the brake operation of the driver is sufficient, the assisting control by the brake control apparatus is not necessary. Therefore, the process proceeds to step S200 for not performing the assisting control of the braking force.

In step S210, the process determines whether a control end condition of the assisting control is fulfilled. The control end condition is, for example, a stop of the subject vehicle, an increase of the index $TTC\_gy$ to be greater than the value Tref by the acceleration of the lead vehicle, a decrease of the index KdB to be smaller than the target value KdB\_t by an amount that is equal to or greater than a predetermined value, or the like. When the control end condition is not fulfilled, the process repeats the process from step S100.

When the index $TTC\_gy$ that considers the lateral acceleration $Gy\_p$ is used as the control end condition in step S210, the degree of risk of collision of the subject vehicle is evaluated correctly to have a smaller value than the straight travel condition when the traveling condition of the subject vehicle transits from the straight travel to the condition that generates the lateral acceleration $Gy\_p$. As a result, the assisting control is promptly concluded when the subject vehicle enters the condition that generates the lateral acceleration $Gy\_p$.

Figure 7:
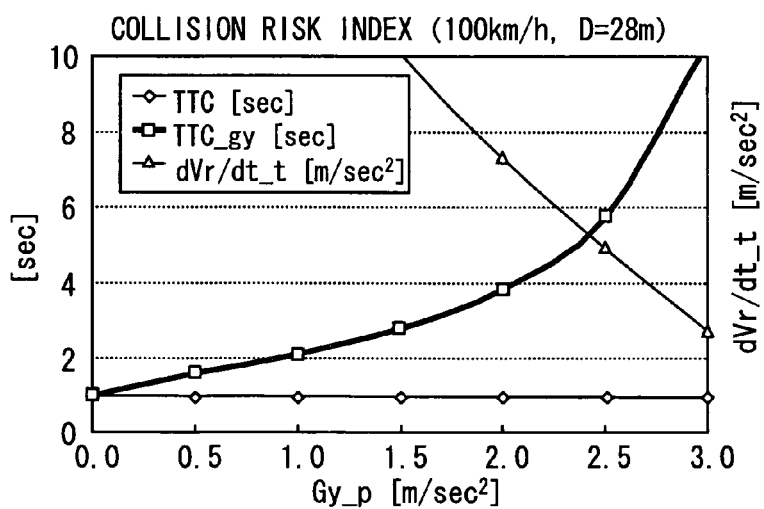
FIG. 7 shows a diagram of a relationship between the conventional TTC index, the collision risk index TTC_gy, a target speed decrease dVr/dt_t, and a current value of a lateral acceleration Gy_p.

The diagram in FIG. 7 shows a relationship of the conventional TTC, the index $TTC\_gy$, the target speed decrease $dVr/dt\_t$ and the current value of the lateral acceleration $Gy\_p$ when the subject vehicle is traveling at the speed V of 100 km/h with the distance D of 28 meters from the front object (a fixed object).

As shown in FIG. 7, the index $TTC\_gy$ for representing the degree of risk of collision increases in proportion to the an increase of the current value of the lateral acceleration $Gy\_p$, while the conventional TTC is constant regardless of the current value of the lateral acceleration Gy_p by a steering operation. In addition, the increase of the TTC_gy leads to a decrease of the target speed decrease dVr/dt_t.

Because the TTC_gy that is utilized by the brake control apparatus in the present embodiment is, as summarized above, calculated by including the lateral acceleration dependent relative speed Vr_y that is defined by the lateral motion of the subject vehicle, and increases in proportion to the increase of the lateral acceleration Gy_p, the degree of risk of collision of the subject vehicle is correctly determined to be smaller than the straight travel condition based on the index TTC_gy when the lateral acceleration is generated by the motion of the subject vehicle.

Although the present invention has been fully described in connection with the preferred embodiment thereof with reference to the accompanying drawings, it is to be noted that various changes and modifications will become apparent to those skilled in the art.

For example, the index TTC_gy may be calculated by using an equation 16 in the following.

$$TTC\_gy=(D/|Vr\_p|)+(D/|Vr\_y\_p|) \quad \text{[Equation 16]}$$

The value of the index TTC_gy in the equation 16 also increases in proportion to the lateral acceleration Gy_p. That is, when the lateral acceleration Gy_p increases, the value (D/|Vr_y_p|) that is calculated by dividing the distance D with the absolute value of the lateral acceleration dependent relative speed Vr_p increases. Therefore, the value of the index TTC_gy increases when the lateral acceleration Gy_p increases. Thus, the index TTC_gy represents a correct degree of risk of collision of the subject vehicle with the front object even when the subject vehicle travels in a condition that generates the lateral acceleration in the lateral direction of the subject vehicle. As a result, the degree of risk of collision of the subject vehicle with the front object is determined to be smaller when the motion of the subject vehicle generates the lateral acceleration Gy_p.

Such changes and modifications are to be understood as being within the scope of the present invention as defined by the appended claims.

What is claimed is:

1. A vehicle collision determination apparatus comprising:
    a distance acquisition unit acquiring a distance between a subject vehicle and a front object that exists in front of the subject vehicle;
    a relative speed acquisition unit acquiring a relative speed of the subject vehicle relative to the front object;
    a lateral acceleration detector detecting a lateral acceleration for accelerating the subject vehicle in a lateral direction;
    a lateral acceleration dependent relative speed calculation unit calculating the relative speed under an influence of the lateral acceleration, wherein the relative speed of the subject vehicle changes depending on an increase and decrease of the lateral acceleration;
    a collision risk index calculation unit calculating a collision risk index for representing a risk of collision of the subject vehicle with the front object based on the distance acquired by the distance acquisition unit, the relative speed acquired by the relative speed acquisition unit, and the relative speed under the influence of the lateral acceleration calculated by the lateral acceleration dependent relative speed calculation unit; and
    a collision determination unit determining the risk of collision of the subject vehicle with the front object by utilizing the collision risk index calculated by the collision risk index calculation unit; wherein
    the collision risk index calculation unit calculates a collision risk index TTC_gy by using an equation in the following when a parameter D represents the distance, a parameter Vr represents the relative speed, and a parameter Vr_y represents the lateral acceleration dependent relative speed $$TTC\_gy=D/(Vr-Vr\_y) \quad \text{[Equation]}.$$

2. The vehicle collision determination apparatus of claim 1 further comprising:
    a turn radius acquisition unit acquiring a turn radius of the subject vehicle when the lateral acceleration of the subject vehicle is generated in the lateral direction of the subject vehicle,
    wherein the lateral acceleration dependent relative speed calculation unit calculates a lateral acceleration dependent relative speed Vr_y by using an equation in the following when a parameter Gy represents the lateral acceleration, and a parameter R represents the turn radius $$Vr\_y=-(R\times Gy)^{1/2} \quad \text{[Equation]}.$$

3. The vehicle collision determination apparatus of claim 1 further comprising:
    a brake force control unit controlling a brake force of a brake unit for adjusting a speed decrease of the subject vehicle to a target speed decrease,
    wherein the brake force control unit uses the collision risk index as a control termination condition for terminating a control of the brake force.

4. A vehicle collision determination apparatus comprising:
    a distance acquisition unit acquiring a distance between a subject vehicle and a front object that exists in front of the subject vehicle;
    a relative speed acquisition unit acquiring a relative speed of the subject vehicle relative to the front object;
    a lateral acceleration detector detecting a lateral acceleration for accelerating the subject vehicle in a lateral direction;
    a lateral acceleration dependent relative speed calculation unit calculating the relative speed under an influence of the lateral acceleration, wherein the relative speed of the subject vehicle changes depending on an increase and decrease of the lateral acceleration;
    a collision risk index calculation unit calculating a collision risk index for representing a risk of collision of the subject vehicle with the front object based on the distance acquired by the distance acquisition unit, the relative speed acquired by the relative speed acquisition unit, and the relative speed under the influence of the lateral acceleration calculated by the lateral acceleration dependent relative speed calculation unit; and
    a collision determination unit determining the risk of collision of the subject vehicle with the front object by utilizing the collision risk index calculated by the collision risk index calculation unit; wherein
    the collision risk index calculation unit calculates a collision risk index TTC_gy by using an equation in the following when a parameter D represents the distance, a parameter Vr represents the relative speed, and a parameter Vr_y represents the lateral acceleration dependent relative speed $$\text{[Equation]} TTC\_gy=D/(Vr-Vr\_y).$$

5. The vehicle collision determination apparatus of claim 4 further comprising:

a turn radius acquisition unit acquiring a turn radius of the subject vehicle when the lateral acceleration of the subject vehicle is generated in the lateral direction of the subject vehicle, wherein the lateral acceleration dependent relative speed calculation unit calculates a lateral acceleration dependent relative speed $Vr\_y$ by using an equation in the following when a parameter $Gy$ represents the lateral acceleration, and a parameter $R$ represents the turn radius

[Equation] $Vr\_y = -(R \times Gy)^{1/2}$.

6. The vehicle collision determination apparatus of claim 4 further comprising:
a brake force control unit controlling a brake force of a brake unit for adjusting a speed decrease of the subject vehicle to a target speed decrease,
wherein the brake force control unit uses the collision risk index as a control termination condition for terminating a control of the brake force.

7. A vehicle collision determination apparatus comprising:
a distance acquisition unit acquiring a distance between a subject vehicle and a front object that exists in front of the subject vehicle;
a relative speed acquisition unit acquiring a relative speed of the subject vehicle relative to the front object;
a lateral acceleration detector detecting a lateral acceleration of the subject vehicle in a lateral direction;
a lateral acceleration dependent relative speed calculation unit calculating the relative speed under influence of the lateral acceleration based on the lateral acceleration;
a collision risk index calculation unit calculating a collision risk index for representing a risk of collision of the subject vehicle with the front object based on the distance acquired by the distance acquisition unit, the relative speed acquired by the relative speed acquisition unit, and the relative speed under the influence of the lateral acceleration calculated by the lateral acceleration dependent relative speed calculation unit; and
a collision determination unit determining the risk of collision of the subject vehicle with the front object by utilizing the collision risk index calculated by the collision risk index calculation unit, wherein the collision risk index is calculated as a scalar product of one dimensional numbers.

8. The vehicle collision determination apparatus of claim 7 further comprising:
a turn radius acquisition unit acquiring a turn radius of the subject vehicle when the lateral acceleration of the subject vehicle is generated in the lateral direction of the subject vehicle,
wherein the lateral acceleration dependent relative speed calculation unit calculates a lateral acceleration dependent relative speed $Vr\_y$ by using an equation in the following when a parameter $Gy$ represents the lateral acceleration, and a parameter $R$ represents the turn radius

[Equation] $Vr\_y = -(R \times Gy)^{1/2}$.

9. The vehicle collision determination apparatus of claim 7 further comprising:
a brake force control unit controlling a brake force of a brake unit for adjusting a speed decrease of the subject vehicle to a target speed decrease,
wherein the brake force control unit uses the collision risk index as a control termination condition for terminating a control of the brake force.

* * * * *